June 13, 1939. G. W. EMRICK 2,162,250
CLUTCH MECHANISM FOR TAPPING ATTACHMENTS
Filed Jan. 19, 1937
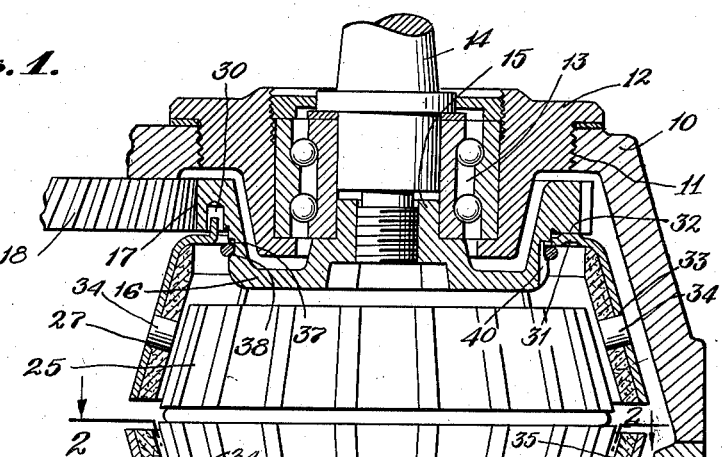
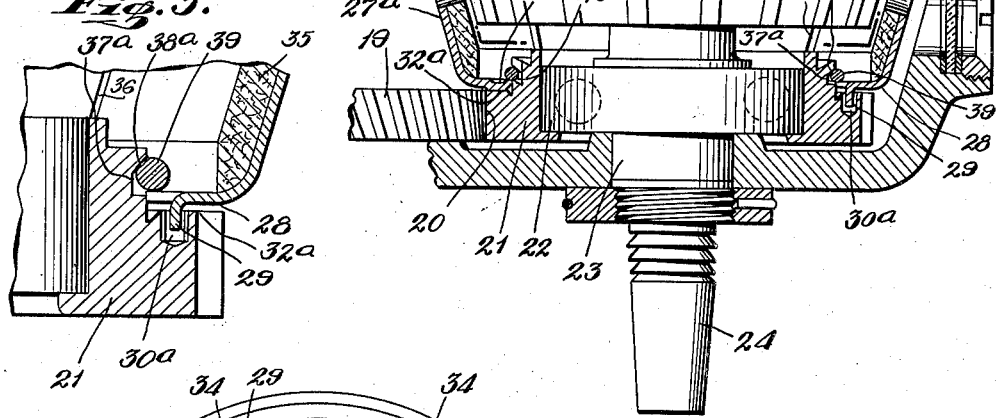
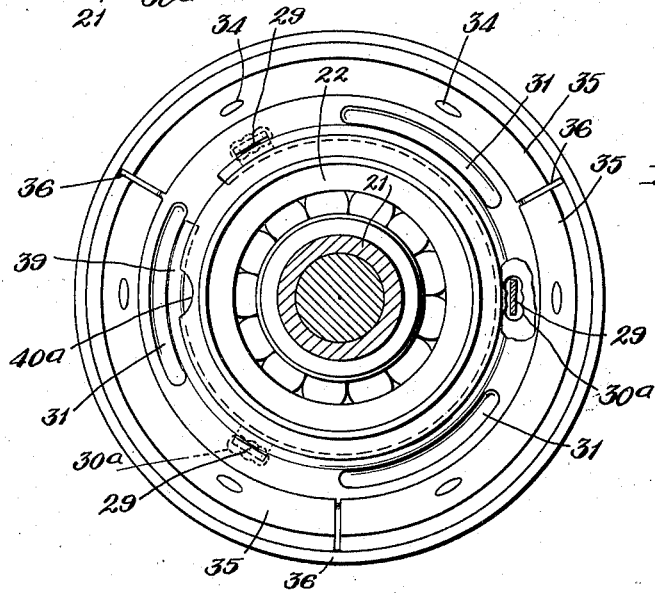
INVENTOR
GEORGE W. EMRICK
BY
ATTORNEY Patented June 13, 1939

2,162,250

UNITED STATES PATENT OFFICE 2,162,250

CLUTCH MECHANISM FOR TAPPING ATTACHMENTS

George W. Emrick, Brooklyn, N. Y.

Application January 19, 1937, Serial No. 121,280

2 Claims. (Cl. 192—66)

This invention relates to tapping attachments and particularly to the economical drive shell or sleeve of such attachment, and the object of the invention is to provide means for quickly attaching and detaching the shell with a gear or other body portion of the drive to facilitate replacement and renewal of the friction facing employed on shells of the kind under consideration, or in the repair or replacement of the shell or other part of the attachment as a whole; a further object being to provide means for keying the shell to the gear or other body to which it is coupled; a further object being to provide means for properly seating the shell upon said body when coupled thereon; a still further object being to provide means for retaining the shell in position in such manner as to permit proper alinement of the shell upon the body to which it is attached; and with these and other objects in view the invention consists in a device of the class and for the purpose specified which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a sectional view through the clutch mechanism of a tapping attachment showing two friction shells mounted in connection with forward and reverse drive members.

Fig. 2 is a partial section on the irregular line 2—2 of Fig. 1; and

Fig. 3 is an enlarged sectional view of a part of the construction shown in Fig. 1.

In Fig. 1 of the drawing, I have shown at 10 a part of the casing of a tapping attachment somewhat similar to the attachment shown in my prior U. S. Patent No. 2,035,224 granted March 24, 1936, the casing having a large threaded opening 11 at one side of the top thereof for receiving a closure cover or cap 12 in which is arranged a suitable ball bearing 13 for the tapered shank or spindle 14 and a sleeve portion 15 of a clutch driving member 16. The member 16 includes a gear portion 17 with which meshes a gear 18 of a transmission gear mechanism, not shown, for transmitting the drive of the member 16 to a gear 19 meshing with a gear 20 on a reverse drive clutch member 21, the latter being arranged in the lower part of the casing 10 and operating upon a ball bearing 22 arranged around a bushing 23 through which the driven spindle 24 of the attachment passes. The upper or inner end of the spindle 24 has a driving head consisting of two oppositely tapered cones 25 and 26 coupled with the spindle 24 in the manner disclosed in said earlier patent, and more specifically defined in U. S. Patent No. 1,988,967 of January 22, 1935.

The attachment above described and illustrated in the accompanying drawing, in part, is simply to disclose one form of device to which my present invention can be applied and, in practice, the forward drive member 16 and the reverse drive member 21 are so constructed as to provide means for detachably coupling conical drive sleeves or shells 27—27a therewith, in position to operatively engage the conical heads 25—26 respectively in the operation of driving the spindle 24 in forward and reverse direction.

In that the structure of each shell 27—27a is the same, the brief description of one will apply to both. The narrow or contracted end of each shell has an inwardly extending wall 28, which is cut out and fashioned at three equally spaced intervals to form outwardly extending keyed tongues 29 adapted to enter corresponding recesses or apertures 30—30a formed in the members 16—21 respectively to key the shell against rotary movement with respect to said members. Intermediate the tongues 29, the wall 28 is pressed outwardly to form elongated arc-shaped seating members 31 to provide proper seating alinement of the shells upon the surfaces 32—32a of the members 16 and 21 respectively, as clearly seen in Fig. 1 of the drawing. The tapered walls of the shells 27—27a are provided with a plurality of apertures 33 in which are secured plugs 34 by an adhesive or otherwise, and said plugs serve to key and secure segmental facings 35 of friction material to the inner faces of the conical shells, as clearly illustrated in Figs. 1 and 2 of the drawing, the segments being separated at the points 36 so as to compensate for expansion and contraction of said segments and further facilitate proper seating of the facings upon the heads 25—26.

In the construction shown, at least two of the plugs or coupling pins 34 pass through each segment 35 and are secured thereto, to retain the segments against displacement, and it will be understood, in this connection however, that any number of couplings may be employed and one or more sub-divisions may be provided on the facing material. Each member 16—21 is provided with a circumferential groove 37—37a arranged in registering position with the wall 28 of the shell coupled therewith, one wall of the groove being beveled as seen at 38—38a so that a spring ring 39 provided in the groove will operate upon the beveled wall 38—38a to force the wall 28 of the shell, or the members 31 thereof, into contact with the surfaces 32—32a and to tensionally support the shell against displacement from the supporting members with the keyed tongues 29 arranged in the apertures 30—30a of the respective members. It is also preferred that the members 16—21 be cut-out or recessed, as indicated at 40—40a, to facilitate the insertion of a tool behind the spring ring 39 to permit quick detachment of the ring as will appear from a consideration of Fig. 2 of the drawing.

With my improved construction, it will appear that the clutch shell, including the facings thereof, may be quickly and easily attached to and detached from the respective supporting members 16—21 when the top and bottom portions of the casing are separated and the spindle 24 and heads 25 and 26 are removed, it being understood that the members 16 and 21 need not be disturbed in the casing or parts thereof in the operation of attaching or detaching the shell, it being apparent that the separate parts of the casing abut substantially centrally thereof and in alinement with the adjacent edges of the shell. In addition to the saving of time in the replacement of the parts most likely to wear, my invention also reduces the cost of making a repair or replacement, by reason of the fact that the supporting members 16—21 are undisturbed in the detachment of the parts 27—27a and replacement of the members 16—21 is not necessary.

In addition to the foregoing, my invention assures the more perfect arrangement of the conical friction shell upon the supporting member and avoids the difficulty in inaccurately made parts experienced when the shell constitutes an integral part of the driving member as taught in the patents heretofore cited, and at the same time more positive alinement of the shell with the head 25—26 is assured, thereby producing a more efficient operating device and eliminating unnecessary stresses and strains.

In addition to the foregoing advantages, it will also be apparent that by stamping the shells out of sheet metal the cost thereof may be materially reduced while at the same time accuracy can be assured in the volume production of the parts and in the use of these parts as replaced or renewed parts.

The members 31 provide what might be termed a three-point bearing which can be properly finished to seat on surfaces 32, 32a and to compensate for any irregularities on said surfaces or on the shells.

Having fully described my invention, what I claim as new and desire to secure by Letters Patent, is:

1. In a tapping attachment, a drive member for transmitting the power from a drive spindle to a spindle to be driven through a conical head on the driven spindle, a conical clutch shell for engaging said conical head, means on said shell and drive member for detachably coupling the shell with said member and for keying the shell against rotary movement on said member, means for alining one surface of said shell upon one surface of said member, said first-named means comprising a groove in said member and a spring ring seating in said groove and engaging said shell to support the last-named surfaces in abutting relation to each other, said groove having a tapered wall engaged by said spring ring to tensionally support the clutch shell in operative position, and the inner surface of the clutch shell having a friction facing sub-divided into independent segments.

2. A friction drive shell for attachments of the class described, said shell comprising a conical body, the contracted end of which is provided with an inturned annular flange forming a mounting hub portion, said flange having circumferentially spaced key elements formed from the material thereof and projecting outwardly beyond the contracted end of said body, and the outer surface of said flange having circumferentially spaced and extending seats for alining said body upon a supporting surface.

GEORGE W. EMRICK.